Figure 1:
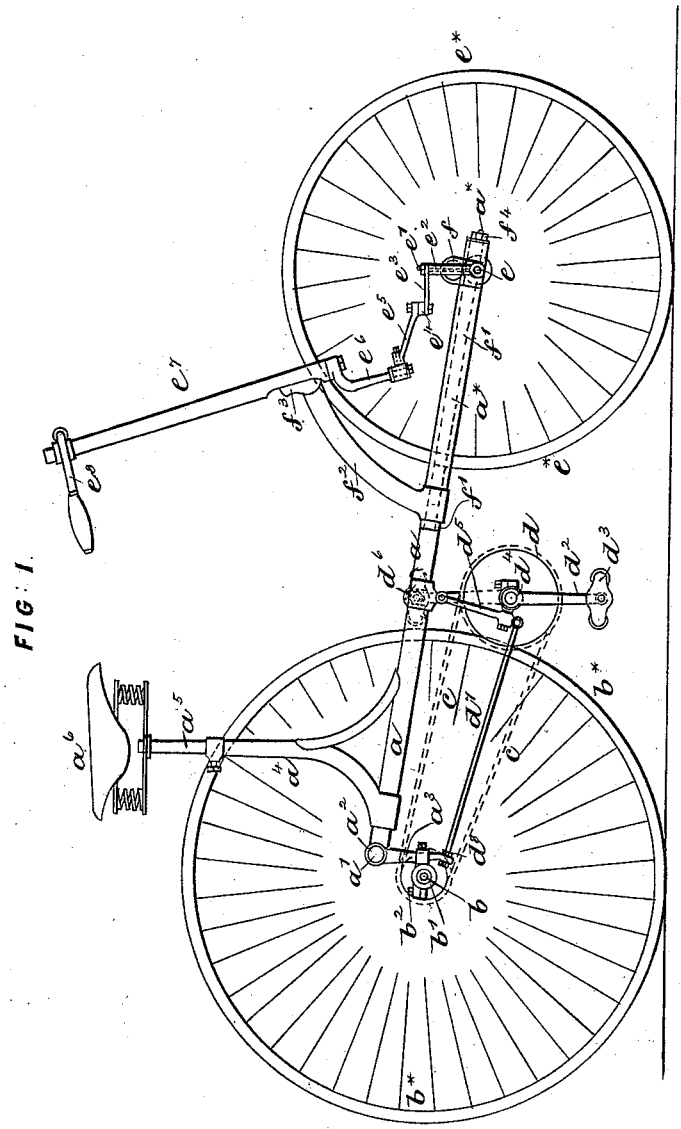

(No Model.) 6 Sheets—Sheet 1.

W. PHILLIPS & R. W. SMITH.
VELOCIPEDE.

No. 416,493. Patented Dec. 3, 1889.

Witnesses
Alex Mahon
H. M. Sterling

Inventors
Walter Phillips
R. W. Smith
-by-
I. W. Sinsabaugh
Atty

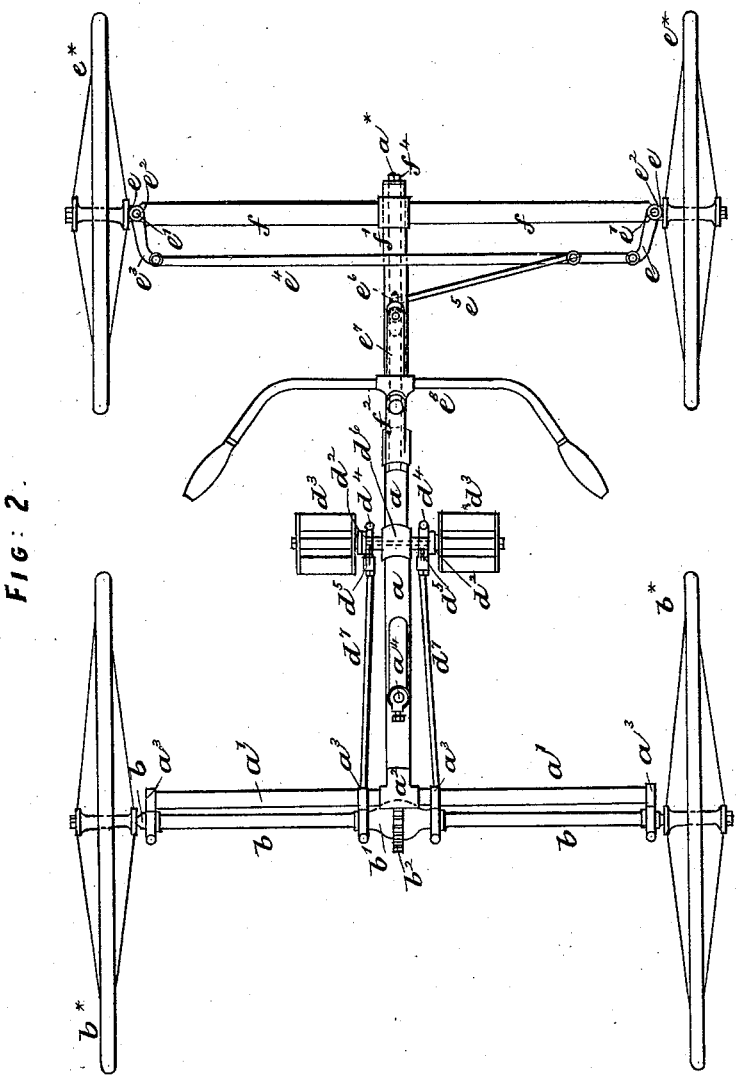

(No Model.) 6 Sheets—Sheet 3.
W. PHILLIPS & R. W. SMITH.
VELOCIPEDE.
No. 416,493. Patented Dec. 3, 1889.
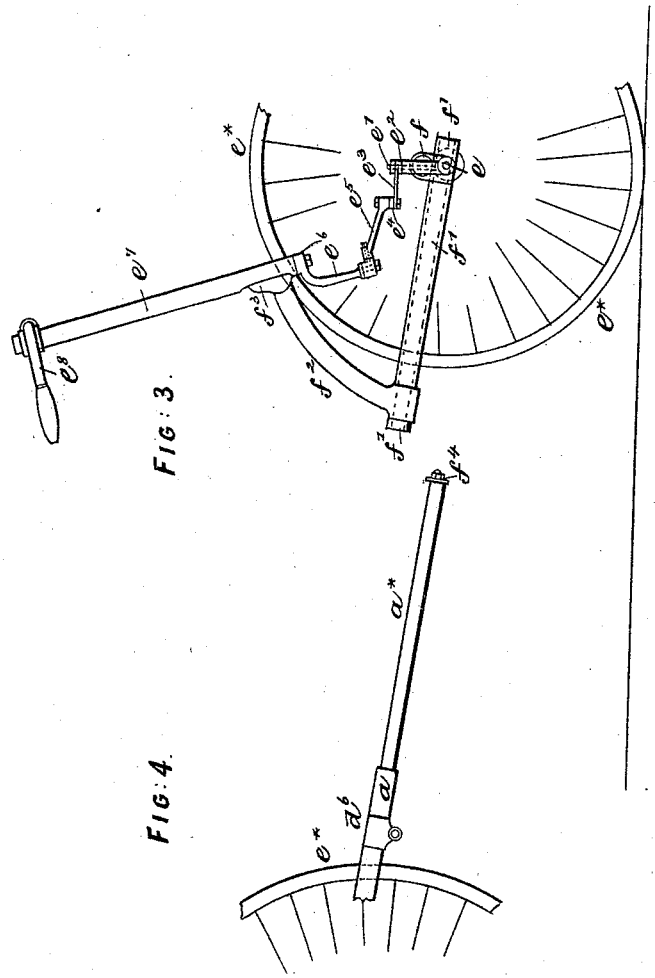

(No Model.) 6 Sheets—Sheet 4.
W. PHILLIPS & R. W. SMITH.
VELOCIPEDE.
No. 416,493. Patented Dec. 3, 1889.
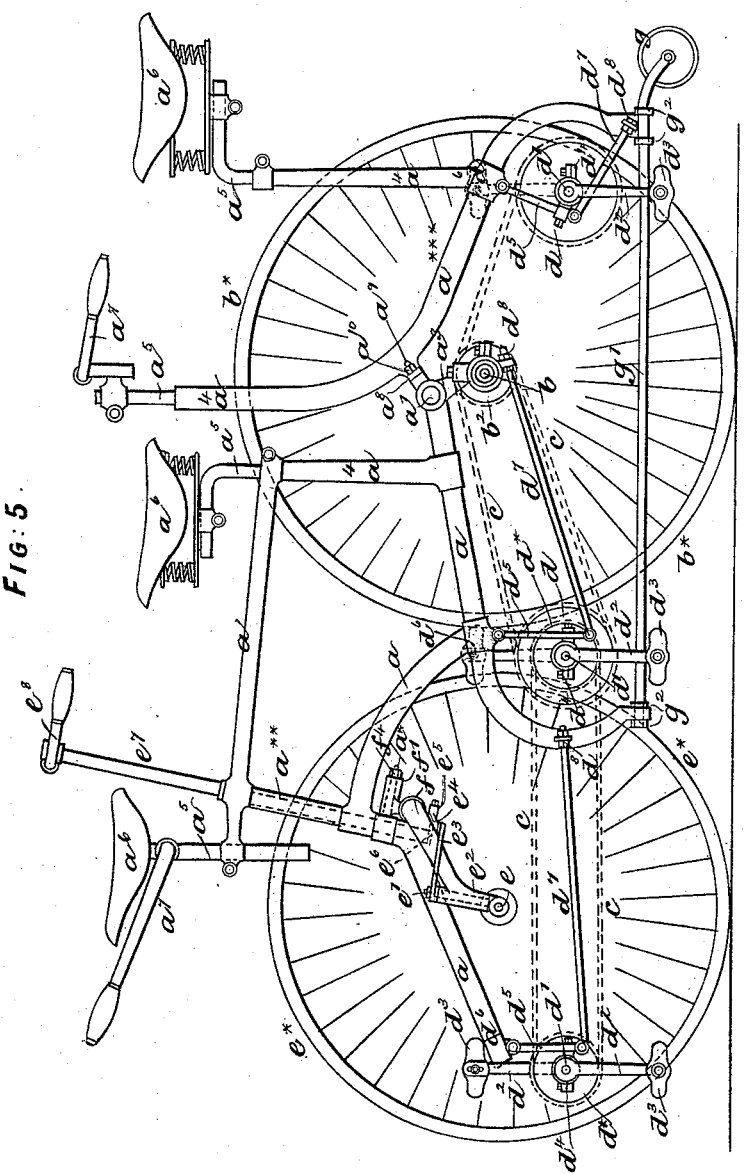

(No Model.) 6 Sheets—Sheet 5.

W. PHILLIPS & R. W. SMITH.
VELOCIPEDE.

No. 416,493. Patented Dec. 3, 1889.

Witnesses.
Alex Mahon
H. M. Sterling

Inventors.
Walter Phillips
R. W. Smith
—by—
L. W. Sinsabaugh
Atty (No Model.) 6 Sheets—Sheet 6.
W. PHILLIPS & R. W. SMITH.
VELOCIPEDE.
No. 416,493. Patented Dec. 3, 1889.
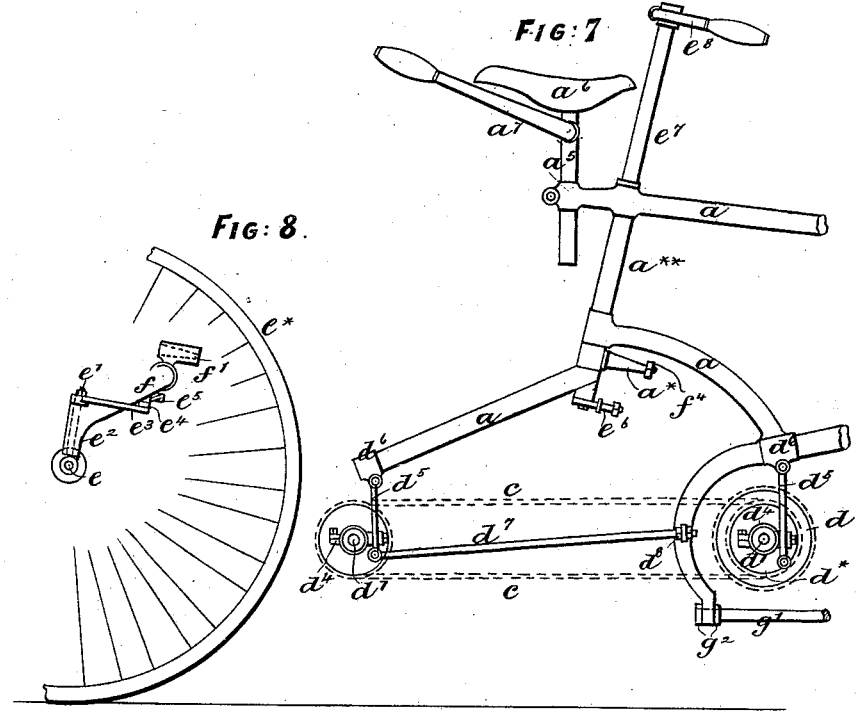
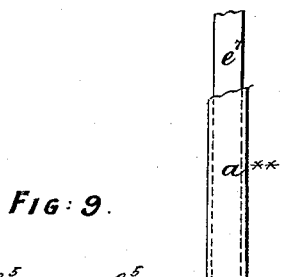
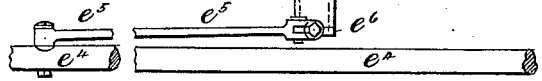
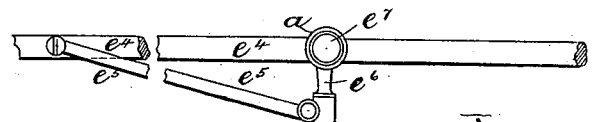

UNITED STATES PATENT OFFICE.

WALTER PHILLIPS AND ROBERT WALKER SMITH, OF COVENTRY, ENGLAND.

VELOCIPEDE.

SPECIFICATION forming part of Letters Patent No. 416,493, dated December 3, 1889.

Application filed December 4, 1888. Serial No. 292,625. (No model.) Patented in England October 8, 1888, No. 14,427; in France November 14, 1888, No. 194,107, and in Germany November 18, 1888, No. 47,199.

*To all whom it may concern:*

Be it known that we, WALTER PHILLIPS, manager to The Rudge Cycle Company, (Limited,) residing at No. 34 Spon Street, Coventry, England, and ROBERT WALKER SMITH, machinist, residing at No. 6 York Street, Coventry, aforesaid, subjects of the Queen of Great Britain, have invented new and useful Improvements in Velocipedes, (the same having been patented in England, dated October 8, 1888, No. 14,427; Germany November 18, 1888, No. 47,199, and France November 14, 1888, No. 194,107,) of which the following is a specification.

The object of this invention is to obtain a velocipede that is comparatively safe from the danger of capsizing or overturning, and generally of an improved construction and arrangement. For this purpose we construct the machine with four wheels, making two tracks, and we drive the two rear wheels through a differential gear of suitable construction, which is by a chain-wheel and chain connected with a chain-wheel, upon the axle of which are fixed the usual cranks and pedals. The axle of the two rear wheels is supported in bearings carried by a cross frame or carriage connected to the longitudinal frame or backbone. The pedal-axle is mounted in bearings which are held or suspended by links pin-jointed to the backbone, and the chain is strained or adjusted to the required tension by means of rods or stays which are at one end hinged or pin-jointed to the bearings or links and at the other end screw-threaded and passed through holes formed in brackets or offsets from the back of the cross frame or carriage, the required adjustment being obtained by a nut or nuts screwing upon the ends of such rods or stays. The front or steering wheels are mounted upon short axles, from which rise spindles which work in long bearings carried by the front cross frame or carriage, and to these short axles are fixed the inner ends of short levers, the outer ends of which are bent or curved inward toward the longitudinal frame or backbone, and are coupled by means of a connecting-rod, to which they are hinged or pin-jointed, so that a differential leverage or movement is imparted to the steering-wheels, by which means they are caused to travel in circles or arcs of circles struck from one given center. The connecting-rod is, by a link pin-jointed thereto and a universal joint, connected to a crank or offset from the steering rod or spindle, which latter is mounted with capability of turning upon or in a head or bearing carried by a short tube or support rising from a sleeve carried by the backbone. This tube or support and the front cross frame or carriage carrying the wheels are all fixed to the tube or sleeve, which fits upon the backbone or upon a stud or axle carried by some part of the framing with capability of partially revolving thereon, and is secured in position by means of a nut or key, by which construction the front or steering wheels are permitted to readily follow the inequalities of the road, and are capable of being readily removed, together with the cross-frame and connected parts, when desired. The saddle is carried by a pillar adjustable on a standard rising from the backbone.

The foregoing is a description of our invention as applied to a velocipede arranged for a single rider; but our improvements are equally applicable to tandem velocipedes constructed to carry two or more riders, in which case all the pedal-axles are coupled by means of chains and additional chain-wheels in such manner that the combined power of the several riders is imparted to the rear driving-wheels. The framing is suitably modified to carry the additional saddles and other necessary parts, and the rear additional saddle and its connected parts are preferably carried by a separate frame capable of being connected with and disconnected from the main frame, as desired, and a small guard or safety wheel is preferably arranged at the rear of the machine, so that it is normally carried clear of the road.

And in order that the said invention may be more clearly understood and readily carried into effect, we will proceed, aided by the accompanying drawings, more fully to describe the same.

Figure 6:
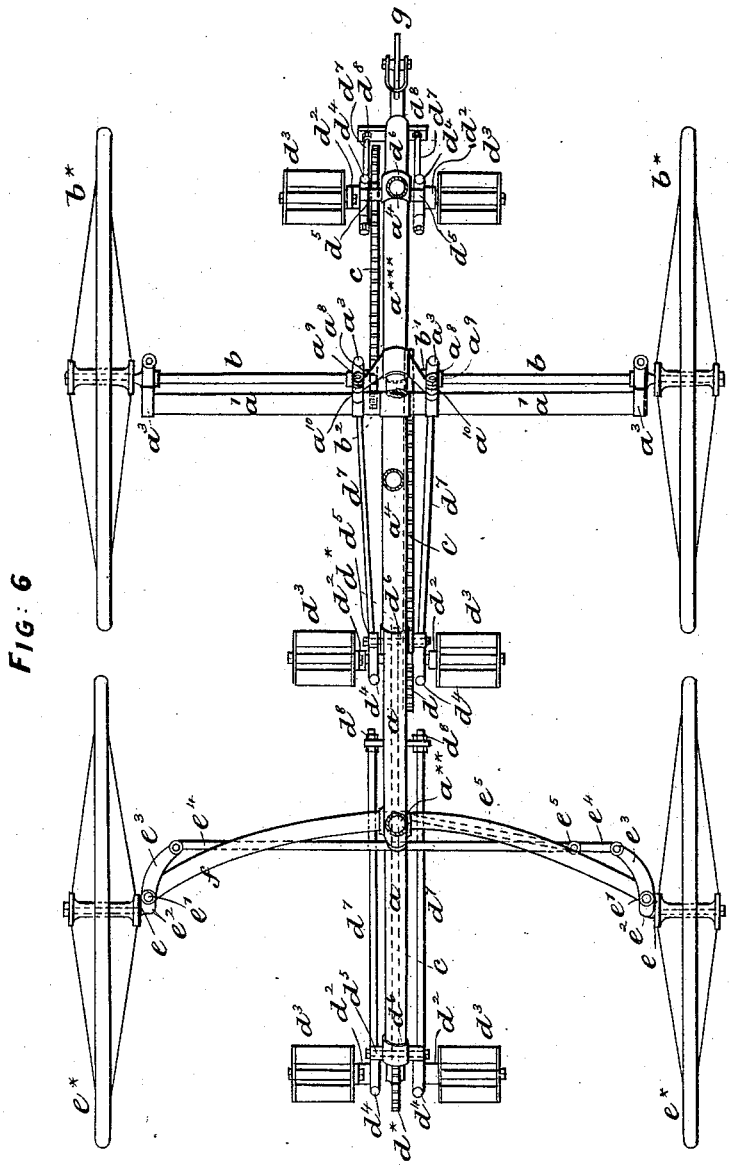

In the drawings, Figure 1 is a side elevation of a velocipede constructed according to our invention and arranged to carry a single rider. Fig. 2 is a plan thereof, and Figs. 3 and 4 are respectively separate detail views showing more clearly the method of mounting the front cross-frame upon its axle. Fig. 5 is a side elevation of a tandem machine constructed according to our invention and arranged to accommodate three riders. Fig. 6 is a plan thereof. Figs. 7 and 8 are detail views of a similar character to those represented at Figs. 3 and 4. Fig. 9 is a part rear elevation, and Fig. 10 is a part plan, showing the connections from the steering-spindle to the connecting-rod of the steering mechanism.

In the several figures of the drawings like parts are indicated by similar letters of reference.

Referring to Figs. 1 to 4, $a$ represents the longitudinal framing of the machine, which is constructed at its rear end with a boss $a^2$, in which is fixed a cross-tube frame or carriage $a'$, or the cross tube or frame $a'$ might be otherwise rigidly connected to the longitudinal frame $a$.

Projecting from the cross frame or carriage $a'$ are several brackets $a^3$, carrying bearings for the divided axle $b$ of the rear or driving wheels $b^*$, and connecting the two parts of the divided axle $b$ is a differential gear $b'$, of any construction, which is, by a chain-wheel $b^2$, carried thereby and a chain $c$, connected with a chain-wheel $d$, fixed upon the pedal-axle $d'$, which carries the usual cranks $d^2$ and pedals $d^3$. The pedal-axle $d'$ is mounted in bearings $d^4$, which are held or suspended by links $d^5$, hinged or pin-jointed to the longitudinal frame or backbone $a$ at $d^6$, and the chain $c$ is strained or adjusted to the required tension by means of rods or stays $d^7$, which are at one end hinged or pin-jointed to the links $d^5$, or it might be to the bearings $d^4$, and at the other end are screw-threaded and pass through holes formed in two of the brackets or offsets $a^3$ from the cross tube or frame $a'$, the required adjustment being obtained by means of nuts $d^8$ screwing upon the rods or stays $d^7$ and taking an abutment against the offsets or brackets $a^3$.

The front or steering wheels $e^*$ are mounted upon short axles $e$, from which rise spindles $e'$, which work in long bearings $e^2$, carried by the cross tube or frame $f$, and to these short axles are fixed the inner ends of short levers $e^3$, the outer ends of which are curved or bent inward and coupled by means of a connecting-rod $e^4$, to which they are hinged or pin-jointed, and the connecting-rod $e^4$ is, by a link $e^5$, one end of which is pin-jointed to such connecting-rod and the other end of which is furnished with a universal joint connected to a crank or offset $e^6$ from the steering-rod or spindle $e^7$, which latter is fitted with steering-handles $e^8$, and is mounted with capability of turning upon a head or bearing $f^3$, carried by a short tubular support $f^2$, rising from a sleeve $f'$, fitted upon the longitudinal frame or backbone $a$. This tubular support $f^2$ and the cross-frame $f$, carrying the wheels $e^*$, are all fixed to the sleeve $f'$, which fits upon the end $a^*$ of the longitudinal frame or backbone $a$, with capability of partially revolving thereon, and is secured in position by means of a nut $f^4$, or it might be a key screwing onto or fitting into the end of the longitudinal frame or backbone $a$. By this construction the front or steering wheels $e^*$ are permitted to readily follow the inequalities of the road, and are capable of being readily removed, together with the cross-frame $f$ and connected parts, when desired.

The object of the peculiar formation of the levers $e^3$ is to cause the wheels $e^*$ in steering to assume slightly-different angles, so arranged relatively to each other that the wheels travel in circles or arcs of circles struck from one given center.

The action of the steering mechanism is as follows: The levers $e^3$ being bent or curved inward and pivoted to the connecting-rod $e^4$, it follows that when such rod is moved through the steering-spindle and intermediate connections, so as to cause the vehicle to describe a curve, the end of the lever $e^3$ actuating that wheel taking the outside curve or circle will travel a less distance than the opposite lever $e^3$, and consequently the inside wheel $e^*$ will assume a greater angle than the outside one. By these means any tendency to the skidding of the wheels when the vehicle is describing curves will be obviated.

The saddle $a^6$ is carried by a pillar $a^5$, adjustably mounted in a standard $a^4$, rising from the longitudinal frame or backbone $a$.

In applying our invention to a tandem quadricycle constructed to carry several riders, as represented at Figs. 5, 6, 7, and 8, we couple all the pedal-axles $d'$, by means of chains $c$ and additional chain-wheels $d^*$, in such manner that the combined power of the several riders is conveyed from their several axles $d'$ to the rear driving-wheels, rods, or stays $d^7$, and connected parts being employed wherever necessary to maintain the desired tension to the chains, as previously described.

The main framing is provided with an extra pillar $a^5$, to carry the additional front saddle and fixed handles; and a detachable frame $a^{*}$, to carry the additional rear saddle $a^6$, handles $a^7$, and pedal-axle and connected parts, is secured to the main frame $a$ by means of a bracket fixed on the rear frame $a^{*}$ and formed with two lugs $a^8$, provided with holes therethrough to fit onto studs $a^9$, carried by the cross-frame $a'$, the parts being securely bound together by nuts $a^{10}$. The lower end of the detachable frame $a^{*}$ is tied to the main frame $a$ by means of a rod $g'$, one end of which is secured to the frame $a^{*}$ and the other end of which is removably secured to the main frame $a$ by means of a nut or nuts $g^2$, and a small guard or safety wheel $g$ is arranged at the rear of the detachable frame $a^{***}$, so that it is normally carried clear of the ground.

By removing the nuts $a^{10}$ and $g^2$ and uncoupling the rear chain the rear additional saddle and connected parts may be readily disconnected from and by the reverse operation connected with the machine when desired.

The sleeve $f'$, carrying the cross-frame $f$, is in this case mounted upon a stud or short axle $a^*$, fixed to the front part of the frame $a$, and the steering-rod $e^7$ takes a bearing in and its lower end passes out through a vertical limb $a^{**}$ of the frame $a$, and is by a crank or offset $e^6$ connected with the link $e^5$ and other parts of the steering-gear, as described, with respect to the previous figures.

We are aware that there are in existence other machines arranged to carry several riders and constructed with a device to enable the machine to follow the inequalities of the road; but such machines are formed with two driving-axles and corresponding driving-wheels, so that all wheels are driven; but as each set of wheels is independently driven, and it is difficult for riders always to pedal in step, the machine is consequently caused to swerve when traveling fast. Now, according to our invention the riders all give motion to one—that is, to the rear driving-axle—while the steering is effected by the front wheels, by which means we obtain steady driving and steering, and the machine is entirely freed from the danger of swerving from its course, even when traveling at its greatest speed.

What we claim is—

A rear-driven four-wheeled velocipede constructed with a longitudinal frame or backbone $a$, detachable rear frame $a^{***}$, cross frame or carriage $a'$, fixed to the rear end of such longitudinal frame $a$, cross frame or carriage $f$, mounted upon a horizontal axis formed on or carried by the forward end of the frame $a$ or some part carried thereby, short axles $e$, carrying the wheels $e^*$, vertical spindles $e'$, rising from the axles $e$ and working in long bearings $e^2$, formed on or fixed to the cross-frame $f$, such spindles $e'$ being fitted with short levers $e^3$, the outer ends of which are bent or curved inward and coupled by means of a connecting-rod $e^4$, which is by a link $e^5$ connected to a crank or offset $e^6$ from the steering rod or spindle $e^7$, all in manner substantially as herein shown and described, and for the purpose stated.

WALTER PHILLIPS.
ROBERT WALKER SMITH.

Witnesses:
    ARTHUR AMOS BARROWS,
        *Banas Lane, Coventry.*
    WILLIAM BEARD BROMLEY,
        *Queen Victoria Road, Coventry.*